United States Patent [19]  [11]  4,014,841
Taub  [45]  Mar. 29, 1977

[54] AEROSOL LATEX PAINT CONTAINING CATIONIC SURFACTANTS

[75] Inventor: Bernard Taub, Williamsville, N.Y.

[73] Assignee: Allied Chemical Corporation, Morris Township, N.J.

[22] Filed: Apr. 24, 1975

[21] Appl. No.: 571,126

[52] U.S. Cl. .............. 260/29.6 MN; 260/29.6 MH; 260/29.6 ME

[51] Int. Cl.$^2$ ......................................... C08L 31/04

[58] Field of Search .......... 260/29.6 MN, 29.6 MH, 260/29.6 ME, 32.4, 33.2 R, 33.6 UA, 33.8 UA, 29.6 WQ; 252/305

[56] References Cited

UNITED STATES PATENTS

| | | | |
|---|---|---|---|
| 2,524,590 | 10/1950 | Boe | 106/243 |
| 2,887,460 | 5/1959 | Dibert et al. | 260/29.6 MN |
| 3,287,290 | 11/1966 | Bray, Jr. | 260/29.6 MM |
| 3,892,703 | 7/1975 | Burke, Jr. | 260/29.6 R |

OTHER PUBLICATIONS

"High Polymer Latices," by Blackley, p. 112, Applied Science Publishers Ltd., London, 1966.

*Primary Examiner*—M. J. Welsh
*Attorney, Agent, or Firm*—Anthony J. Stewart; Jay P. Friedenson

[57] ABSTRACT

An aerosol latex paint formulation is provided by emulsifying a latex paint in a liquid propellant composition which is a hydrocarbon or a halogenated hydrocarbon and which contains a cationic surfactant which is an ethylene oxide adduct of certain amines. The formulation is placed in a container suitably equipped with a spray nozzle. Preferably a wetting agent is also incorporated in the liquid component to provide better paint application.

11 Claims, No Drawings

AEROSOL LATEX PAINT CONTAINING CATIONIC SURFACTANTS

This invention relates to sprayable paint formulations. More particularly, this invention relates to latex paint formulations sprayable by means of an aerosol.

One of the most significant developments in the field of paints and other protective coatings in the last thirty years has been the rapid growth and widespread acceptance of water-based paints. Since they were first introduced in the late forties as an interior wall finish composed of a water-based styrene-butadiene latex, there has been a great increase in the sales of these paints. The greatest increase has been in the trade sales type paints and to a lesser extent in maintenance, industrial and other type finishes. Presumably the prime reason for the popularity of these paints, made with new raw materials developed in this period, particularly new synthetic latices, is their ease of application. The paints are practically odorless during application and dry rapidly. Furthermore, as wall finishes they are tough and washable while rollers and brushes used to apply the paint may be cleaned with water. Also, paint which drips or spatters onto the hands of the person applying the paint can be removed with soap and water.

Latex wall paints produce a low sheen or gloss finish which has good washability within a short period after application. In cases of scratches, mars or dirt pick-up during this period, it is only necessary to touch up the wall with the original paint. In some cases, however, this becomes impracticable because of the necessity to save some of the original paint or it becomes inconvenient and time consuming to prepare and clean up the equipment such as brushes or rollers. A convenient solution would be the availability of an aerosol can to touch up the scratches, mars or missed spots.

Since the introduction of aerosol surface coatings, major steps have been taken to improve the formulation of these materials. Originally, all aerosol paints were clear acrylic lacquers. However, both nitrocellulose and alkyd resins have found a place for high quality gloss interior use. The acceptance of aerosol paints is a result of the inherent advantages of this type of application. The aerosol package is a self-contained spraying unit and, in contrast to brushing, they require no preparation such as thinning, etc. there is no necessity for the preparation and maintenance of equipment such as brushes, or special clean up solvents. Because of exclusion of air from the package, the aerosol paint has almost unlimited shelf-life. Because of the convenience of aerosol paints, they are particularly popular to home owners for renovating furniture, toys, tools, etc.

Although color matched aerosol paints are available, up to the present time, all such paints have been of the oilbase type. These are high gloss and consequently not suitable for touching up surfaces painted with latex paints. Further, as far as is known, none of these oil-based aerosol paints can be formulated without solvents which are flammable and/or noxious.

Co-pending application Ser. No. 414,597 describes the formation of non-foaming aerosol latex paints. The process involves the emulsification or dispersion of a latex paint in a liquid propellant composition which contains a non-ionic surface active agent dissolved therein. Latex paints suitable for this application included vinyl acetate, acrylic, styrene-butadiene copolymers and vinyl acetate-acrylic copolymers.

During the course of investigation on the storage stability of the aerosol latex paints, it was found that those compositions made from acrylics and styrene-butadiene latices were stable with respect to can corrosion. No rusting was observed with these compositions even after six months storage at 110° F. However, those compositions made from vinyl acetateacrylic copolymer paints, exhibited significant corrosion even after one month at 110° F.

The corrosive characteristics of the vinyl acetateacrylic copolymer paints was attributed to the acid pH of the latex itself (4-5) or its corresponding paint formulation (5-7). Adjustment of the pH of the vinyl acetate-acrylic copolymer paint to a volue of greater than 8 resulted in a product which did not rust out in the aerosol can. However, paint performance was significantly degraded; e.g., gel particles present in the emulsion.

It is an object of this invention to provide an aerosol sprayable latex paint formulation which is stable with respect to can corrosion.

It is a further object of this invention to provide an aerosol latex paint formulation which is easy to apply, does not foam and provides a good surface cover.

These and other objects will become apparent from the description which follows:

BRIEF DESCRIPTION OF THE INVENTION

Briefly, in accordance with the invention there is provided an aerosol latex paint composition composed of a pigment-containing aqueous dispersion of a water-insoluble, vinyl acetate-acrylic copolymer resin emulsified in a liquid propellant component which is a hydrocarbon or a halogenated hydrocarbon and which contains a cationic amine surfactant having an HLB number between 5 and 10. The liquid component comprises 70 to 30 weight percent of the aerosol latex paint system. Additionally, there may be present in the paint composition, a wetting agent which is sometimes desirable for smooth application of the paint. The cationic amine surfactant has the formula:

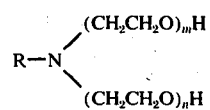

wherein R is a straight chain alkyl, or a straight or branched chain alkyl or aralkyl, containing 7 to 24 carbon atoms, said R can contain a nitrogen atom as an amine linkage and up to two oxygen atoms as ester or ether linkages or as OH groups, and m and n are integers of 0 to 4, with the sum of m and n equal to at least 1, and no greater than 4.

It has been found that latex, water-based paints, formulated in this manner are particularly suitable as aerosol formulations which have good spraying characteristics and satisfy the need for aerosol latex paints.

DETAILED DESCRIPTION OF THE INVENTION

It is known that emulsions are classified into two groups, oil-in-water and water-in-oil. Aerosol emulsion formulations are also classified in this manner. The oil-in-water emulsions are used to produce aerosol foams, such as shaving cream. Water-in-oil aerosol emulsions are employed in non-foaming applications, such as insecticides. Since it is not desirable for an aerosol paint to foam, such emulsions should be of the water-in-oil type. In the water-in-oil emulsion of this invention the "water" component is an aqueous dispersion of a water insoluble vinyl acetate-acrylic copolymer resin containing a pigment. The "oil" phase is the hydrocarbon or halogenated hydrocarbon liquid component. This component acts as a propellant, i.e., a liquid which vaporizes as the pressure is reduced within the aerosol container by opening the valve, or a liquid in which a liquified propellant is dissolved. In the latter case, the liquid will still have a low boiling point in order that evaporation will occur as it exits the container. The liquid, propellant portion will make up between 30 and 70 weight percent of the entire system.

A surfactant is added to the liquid component to assist in the formation of the emulsion. While not wishing to be bound to any particular theory of why the present invention operates in the desired manner while previous attempts to produce a satisfactory aerosol latex paint have failed, it is believed that the selection of surfactant plays an important role in the composition of the present invention. The surfactant employed in the composition of this invention must be cationic to offset the pH effect of the vinyl acetate-acrylic copolymer, it must be soluble in the liquid (oil) component and it must have an HLB number between 5 and 10. HLB is an abbreviation for hydrophile-lipophile balance. An explanation of these values and the method for determining the HLB of non-ionic surfactants can be found in the text "Emulsion and WaterSoluble Paints and Coatings" by Charles R. Martens, published by Reinhold Publishing Corporation (1964) pages 52–57.

The cationic surfactants found suitable in the formation of the aerosol latex paints of this invention are amine-ethylene oxide adducts having the formula:

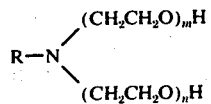

wherein R, m and n are as previously described. The degree of ethoxylation is important since, when the sum of m plus n is 5 or greater the latex paint composition tends to foam as it is sprayed from the aerosol container. This is of course undesirable and to be avoided. The degree of ethoxylation is also reflected in the HLB values since those surfactants having 5 or more ethylene oxide groups have an HLB of greater than 10. Illustrative of cationic amine surfactants which may be employed in this invention are:
  bis-(2-hydroxyethyl) cocoamine
  bis-(2-hydroxyethyl) oleylamine
  bis-(2-hydroxyethyl) tallowamine
  N-(2-hydroxyethyl) laurylamine
  bis-(ω-hydroxyethoxy) stearylamine,
  and the like.
Generally, the surfactant will be present in an amount between 0.5 and 5.0 weight percent of the aerosol paint formulation.

The portion of the composition of this invention which serves as a surface coating, or paint, is the pigmentcontaining aqueous dispersion of a vinyl acetate-acrylic copolymer water-insoluble resin. This is the "water" phase of the water-in-oil emulsion. The dispersion itself may be an emulsion of resin in water or it may be another type of stable dispersion. Any vinyl acetate-acrylic copolymer resin commonly used in latex paints may be employed in the composition of this invention. Generally, the resin will have a molecular weight above 20,000. The paint component of the composition of this invention is prepared in a manner well known to those in the paint art. It is not always necessary to incorporate the usual thickeners into the paint formulations. Indeed, it has been found that in some instances the presence of a thickener is disadvantageous to the extent that it causes the emulsion to break up resulting in an unacceptable spray paint. Thus, thickeners may or may not be employed depending on the specific latex emulsion used and the specific thickener.

It is known that latex paints dry on the surface being coated by allowing the water in the aqueous dispersion to evaporate. In some instances, the aerosol paint compositions of this invention when sprayed from an aerosol container, lose some of the water, presumably while passing from the spray nozzle to the surface, which results in a course, or seedy appearance. It has been found that this occurence can be avoided by adding a compatible wetting agent to the paint formulation. Among the wetting agents found suitable for this purpose are ethylene glycol, propylene glycol, mineral oil, odorless mineral spirits, and the like. Wetting agents of the mineral spirits type are preferred due to their evaporation rate. When a wetting agent is employed it is generally present in an amount of 15% or less, preferably 5–10%, based on the aerosol-paint composition.

The "oil" phase of the water-in-oil emulsion of this invention is composed of hydrocarbons or halogenated hydrocarbons which are either propellants themselves or are propellant blends. The term "propellant" is meant to signify those compounds known in the aerosol art which are either liquified normally gaseous substances, or mixtures of liquified normally gaseous substances and low boiling liquids, which exhibit a vapor pressure sufficiently high to propel a liquid from a pressurized aerosol container.

The hydrocarbons which are useful as propellants are those which have 3 or 4 carbon atoms and are liquifiable under the pressure employed in the aerosol container. The hydrocarbons may be used alone or as a blend of hydrocarbons, in which case the hydrocarbons having 3 or 4 carbon atoms may be mixed with hydrocarbons having up to 10 carbon atoms. There may also be employed blends of a hydrocarbon and a halogenated hydrocarbon. Exemplary of hydrocarbons useful in the aerosol latex paint composition of this invention are: propane, butane, isobutane, mixtures thereof, and the like. These hydrocarbons may be admixed with other low boiling hydrocarbons such as xylene, toluene, and the like.

Halogenated hydrocarbons useful as propellants are those having one to four carbon atoms and are preferably fluorinated. As with hydrocarbons, the halogenated hydrocarbons used as propellants must be liquifiable under the conditions prevailing in the aerosol container and must have a vapor pressure sufficient to carry the paint from the container as the pressure is released. Mixtures of halogenated hydrocarbons may be employed, in which case, the components should be compatible under the prevailing conditions. Within these guidelines, among the halogenated hydrocarbons useful in the aerosol paint formulation of this invention are: trichlorofluoromethane, dichlorodifluoromethane, dichlorofluoromethane, dichloromethane, chlorofluoromethane, trichlorotrifluoroethane, dichlorotetrafluoroethane, dichlorofluoroethane, difluoroethane, perfluorocyclopropane, perfluorocyclobutane, and the like. Especially preferred are mixtures of trichlorofluoromethane with dichlorodifluoromethane and trichlorotrifluoroethane with dichlorodifluoromethane.

In the preparation of the aerosol latex paints of this invention the paint is first prepared to the desired shade, with or without thickeners but preferably without. The latex is in the form of an emulsion of resin in water, and the paint is prepared by known means by addition of pigments, surfactants, defoamers, and the like.

Separately, the "oil" phase component is prepared. In those instances where the propellant is a normally gaseous substance, it is liquified by known means and there is added thereto a surfactant of the type defined above. In those cases wherein the propellant is a mixture of components and one of the components is normally a liquid, the surfactant is added to the liquid component in a suitable container, and the wetting agent, e.g. odorless mineral spirits, is added. The pigmented aqueous latex paint is then added, a suitable valve component is crimped on the container and the mixture is shaken to form an emulsion of latex paint (water) in propellant (oil). If an additional propellant component is to be added, it is done so under pressure to dissolve the additional component in the propellant component already present, and the total mixture is again shaken to form an emulsion.

While hydrocarbon propellants have been found suitable as components of the aerosol latex paint composition of this invention, since they are for the most part flammable, it is preferred to employ the hydrocarbon propellant in conjunction with a halogenated hydrocarbon propellant, and most preferred to employ only halogenated hydrocarbon propellant.

DESCRIPTION OF THE PREFERRED EMBODIMENTS

The following examples are given by way of illustration only. Parts are given by weight unless otherwise noted.

A latex paint composition was prepared in the following manner:

A mixture of 75 parts ethylene glycol, 17 parts of Tamol 731[1], 1 part Triton CF-10[2], 1 part Nopco NDW[3], 100 parts water and 250 parts titanium dioxide was ground with a Cowles dissolver at 4000 rpm for about 10 minutes, and then let down with 580 parts Polyco 2151[4], 14.2 parts tributyl phosphate, 1 part Nopco NDW and 11.7 parts water. This formulation is hereinafter referred to as Paint A.

1. Commercial paint dispersing agent sold by Rohm and Haas Co.
2. Nonyl-phenoxy-polyethoxy-ethanol surfactant (Rohm & Haas Co.)
3. Commercial paint defoamer sold by Diamond Shamrock Co.
4. Commercial acrylic latex sold by Borden Chemical Co.

The following aerosol paint compositions were prepared with the components and amounts indicated. Trichlorotrifluoroethane is placed in a suitable container and the cationic amine surfactant is added followed by the addition of the wetting agent and Paint A. A suitable valve component is crimped on and the mixture is shaken to form an emulsion. Then the emulsion is pressurized with dichlorodifluoromethane and shaken again to form an emulsion.

| Example No. | | I | II | III |
|---|---|---|---|---|
| Trichlorotrifluoroethane | (parts) | 24 | 24 | 24 |
| Bis-(2-hydroxyethyl) cocoamine (HLB 9.9) | " | 2 | | |
| Bis-(2-hydroxyethyl) oleylamine (HLB 9.7) | " | | 2 | |
| Polyoxyethylene oleylamine (contains five ethylene oxide groups) (HLB 11.2) | " | | | 2 |
| Mineral Spirits | " | 10 | 10 | 10 |
| Paint A | " | 30 | 30 | 30 |
| Dichlorodifluoromethane | " | 36 | 36 | 36 |

Aerosol paints I and II emulsified and sprayed satisfactorily with good cover. The paint of Example III was very thick and foamed upon spraying.

Six aerosol vinyl acetate-acrylic paint compositions were produced in the manner described above using a commercial vinyl acetate-acrylic paint composition sold by Sears Roebuck under the trade name "Sears 5-Way Flat," hereinafter referred to as Paint B. The compositions and results are illustrated as follows:

| Example No. | IV | V | VI | VII | VIII | IX | X |
|---|---|---|---|---|---|---|---|
| Trichlorotrifluoroethane | 24 | 24 | 24 | 24 | 24 | 24 | 24 |
| Bis-(2-hydroxyethyl) oleylamine (HLB 9.7) | 1 | | | | | | |
| Polyoxyethylene (5) oleylamine (HLB 11.2) | | 1 | | | | | |
| Bis-(2-hydroxyethyl) cocoamine (HLB 9.9) | | | 1 | | | | |
| Polyoxyethylene (5) cocoamine (HLB>10) | | | | 1 | | | |
| Bis-(2-hydroxyethyl) tallowamine (HLB<10) | | | | | 1 | | |
| Polyoxyethylene (5) tallowamine (HLB>10) | | | | | | 1 | |
| Polyoxyethylene (15) cocoamine (HLB 15.2) | | | | | | | 2 |
| Mineral Spirits | 10 | 10 | 10 | 10 | 10 | 10 | 10 |
| Paint B | 30 | 30 | 30 | 30 | 30 | 30 | 30 |
| Dichlorodifluoromethane | 36 | 36 | 36 | 36 | 36 | 36 | 36 |
| Dispersion | Thin | Thick | Thin | Thick | Thin | Thick | Thick |
| Spray | Wet | Foam | Wet | Foam | Wet | Foam | Foam |

The data summarized in Examples I through IX indicate that cationic surfactants of the ethoxylated amine types are useful in preparing aerosol latex paints of the vinyl acetateacrylic copolymer type only when the ethylene oxide is less than five units.

Additional suitable cationic amine surfactants are polyamine condensates wherein R, in the generic formula above, has a nitrogen amine linkage. For example compounds falling within the generic formula given above and which are polyamine condensates, e.g.,

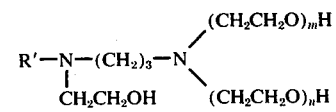

wherein R' is, e.g., oleyl.

Two vinyl acetate-acrylic copolymer paint compositions were produced in the manner described above. The composition and results are illustrated as follows:

| Example No. | | XI | XII |
|---|---|---|---|
| Trichlorotrifluoroethane | (parts) | 24 | 24 |
| Nopcogen 16-0[5] | " | 0.5 | 0.5 |
| Mineral Spirits | " | 10 | 10 |
| Paint A | " | 30 | |
| Paint B | " | | 30 |
| Dichlorodifluoromethane | " | 36 | 36 |

An oleic polyamine condensate surfactant sold by Diamond Shamrock Co.

5. An oleic polyamine condensate surfactant sold by Diamond Shamrock Co.

The dispersion and sprayability of these compositions were good and foaming did not occur.

In order to illustrate the different corrosion effects of non-ionic and cationic amine surfactants in aerosol vinyl acetate-acrylic copolymer latex paint compositions, two compositions were prepared as above having the following components:

| Example No. | | XIII | XIV |
|---|---|---|---|
| Trichlorotrifluoroethane | (parts) | 36 | 36 |
| Arlatone-T[6] | " | 3 | |
| Nopcogen 16-0 | " | | 0.75 |
| Mineral Spirits | " | 15 | 15 |
| Paint B | " | 45 | 45 |
| Dichlorodifluoromethane | " | 54 | 54 |

A non-ionic polyoxyethylene polyol oleic acid ester sold by ICI America.

6. A non-ionic polyoxyethylene polyol oleic acid ester sold by ICI America.

Initially, both compositions sprayed and dried satisfactorily. After three months storage at 110° F, composition XIII exhibited seam corrosion above the liquid level, around the rim and on the valve cup. Composition XIV showed no signs of corrosion. After four months at 110° F, XIII corroded through the aerosol can. After six months at 110° F, XIV sprayed and dried satisfactorily. There were no signs of corrosion in any part of the can.

I claim:

1. An aerosol latex paint composition comprising an emulsion of a pigmented aqueous dispersion of a water-insoluble vinyl acetate-acrylic copolymer resin in a liquid propellant containing a cationic surfactant having an HLB value of between 5 and 10, wherein the liquid propellant comprises 30 to 70 weight percent of the composition and is a hydrocarbon having 3 to 4 carbon atoms, a halogenated hydrocarbon having 1 to 4 carbon atoms, or mixtures thereof, and wherein the cationic surfactant has the formula

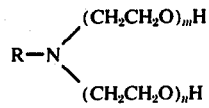

wherein R is a straight chain alkyl, or a straight or branched chain alkyl or aralkyl, containing 7 to 24 carbon atoms, said R can contain a nitrogen atom as an amine linkage and up to two oxygen atoms as ester or ether linkages or as -OH groups, and m and n are integers of 0 to 4, with the sum of m and n equal to at least 1 and not greater than 4.

2. An aerosol latex paint as defined in claim 1 wherein the propellant is a mixture of hydrocabons.

3. An aerosol latex paint as defined in claim 1 wherein the propellant is a mixture of halogenated hydrocarbons.

4. An aerosol latex paint as defined in claim 3 wherein the propellant comprises a fluorinated hydrocarbon.

5. An aerosol latex paint as defined in claim 1 wherein the propellant is a mixture of hydrocarbon and a fluorinated hydrocarbon.

6. An aerosol latex paint as defined in claim 1 containing additionally, up to 15% of a wetting agent.

7. An aerosol latex paint composition as defined in claim 1 wherein the surfactant is bis-(2-hydroxyethyl) cocoamine.

8. An aerosol latex paint composition as defined in claim 1 wherein the surfactant is bis-(2-hydroxyethyl) oleylamine.

9. An aerosol latex paint composition as defined in claim 1 wherein the surfactant is bis-(2-hydroxyethyl) tallowamine.

10. An aerosol latex paint composition as defined in claim 1 wherein the surfactant has the formula

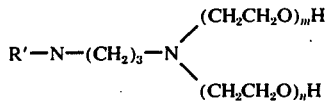

wherein R' is oleyl.

11. An aerosol latex paint composition as defined in claim 3 wherein the surfactant has the formula

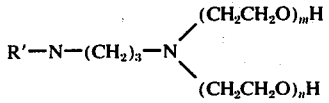

wherein R' is oleyl.

* * * * *